United States Patent [19]

Bantli

[11] Patent Number: 5,657,008
[45] Date of Patent: Aug. 12, 1997

[54] ELECTRONIC LICENSE PLATE HAVING A SECURE IDENTIFICATION DEVICE

[75] Inventor: Heinrich Bantli, Stillwater, Minn.

[73] Assignee: Minnesota Mining and Manufacturing Company, St. Paul, Minn.

[21] Appl. No.: 718,691

[22] Filed: Sep. 27, 1996

Related U.S. Application Data

[63] Continuation of Ser. No. 439,366, May 11, 1995, abandoned.

[51] Int. Cl.$^6$ ............................................. G08G 1/01
[52] U.S. Cl. ...................... 340/933; 340/941; 342/51; 343/713
[58] Field of Search ............................ 340/933, 941, 340/928, 825.3, 825.31, 825.32, 825.54; 362/83.2; 342/44, 51; 343/711, 713

[56] References Cited

U.S. PATENT DOCUMENTS

| | | | |
|---|---|---|---|
| 3,805,231 | 4/1974 | Santoli | 340/426 |
| 4,001,822 | 1/1977 | Sterzer | 343/6.5 |
| 4,730,404 | 3/1988 | Utsch | 40/209 |
| 5,105,179 | 4/1992 | Smith | 340/461 |
| 5,115,245 | 5/1992 | Wen et al. | 342/175 |
| 5,177,494 | 1/1993 | Dorrie et al. | 343/711 |
| 5,282,158 | 1/1994 | Lee | 365/96 |
| 5,286,679 | 2/1994 | Farnworth et al. | 437/209 |
| 5,396,233 | 3/1995 | Hofmann | 340/933 |
| 5,404,664 | 4/1995 | Brooks et al. | 40/202 |
| 5,422,473 | 6/1995 | Kamata | 340/928 |

FOREIGN PATENT DOCUMENTS

| | | | |
|---|---|---|---|
| 0 313 747 | 5/1989 | European Pat. Off. | B60R 13/10 |
| 0 609 453 | 8/1994 | European Pat. Off. | |
| 0 648 653 | 4/1995 | European Pat. Off. | |
| 2 619 944 | 3/1989 | France | |
| 6-232619 | 8/1994 | Japan | H01Q 1/32 |
| 2 222 017 | 2/1990 | United Kingdom | B60R 13/10 |
| 2 256 072 | 11/1992 | United Kingdom | G08G 1/017 |
| 2 227 866 | 5/1993 | United Kingdom | G08G 1/017 |
| WO93/11517 | 6/1993 | WIPO | G08B 13/24 |
| WO95/22132 | 8/1995 | WIPO | |

*Primary Examiner*—Jeffery Hofsass
*Assistant Examiner*—Daniel J. Wu
*Attorney, Agent, or Firm*—Gary L. Griswold; Walter N. Kirn; Kari H. Bartingale

[57] ABSTRACT

A electronic license plate system having an identification device embedded in a license plate portion and electronics stored in a license plate holder ensures that the proper identification device is connected to the electronics. The identification device is constructed in a manner such that tampering with the device will render is inoperable. Also, if an improper license plate is mounted to the license plate holder of a vehicle, a security system will disable the electronics of the system or will transmit a alarm signal.

18 Claims, 9 Drawing Sheets

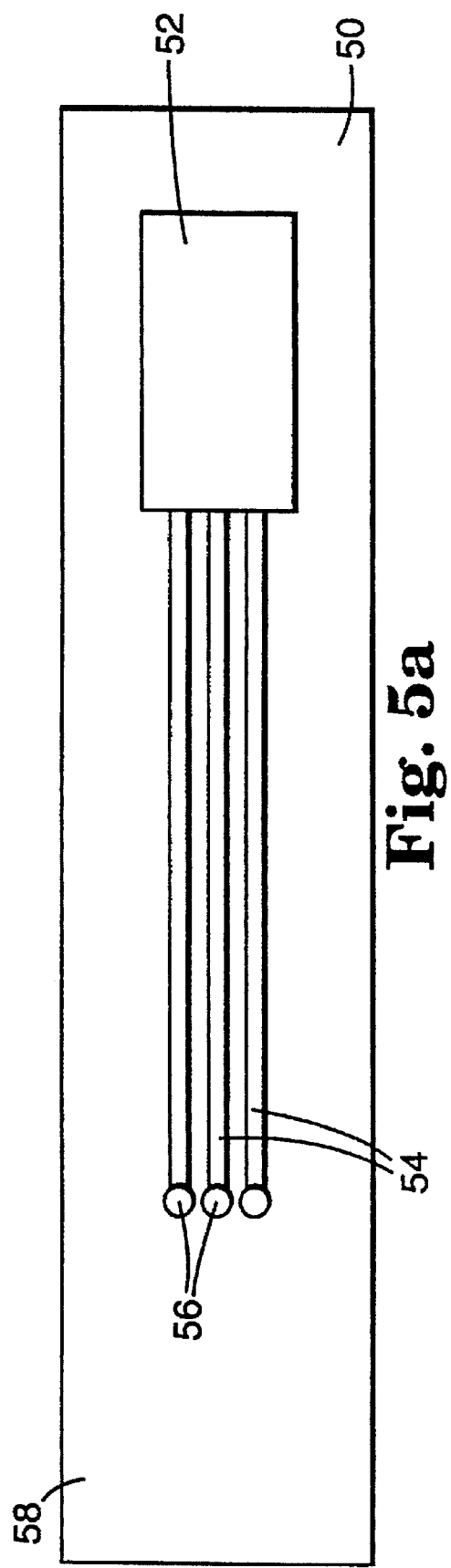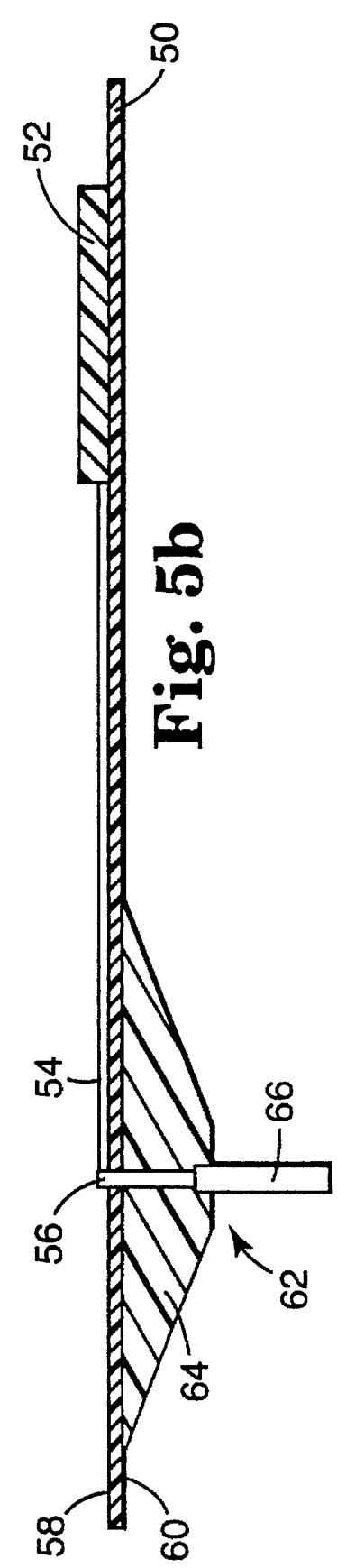

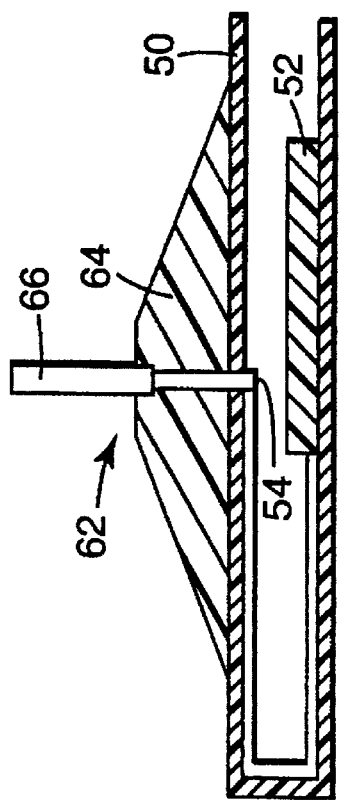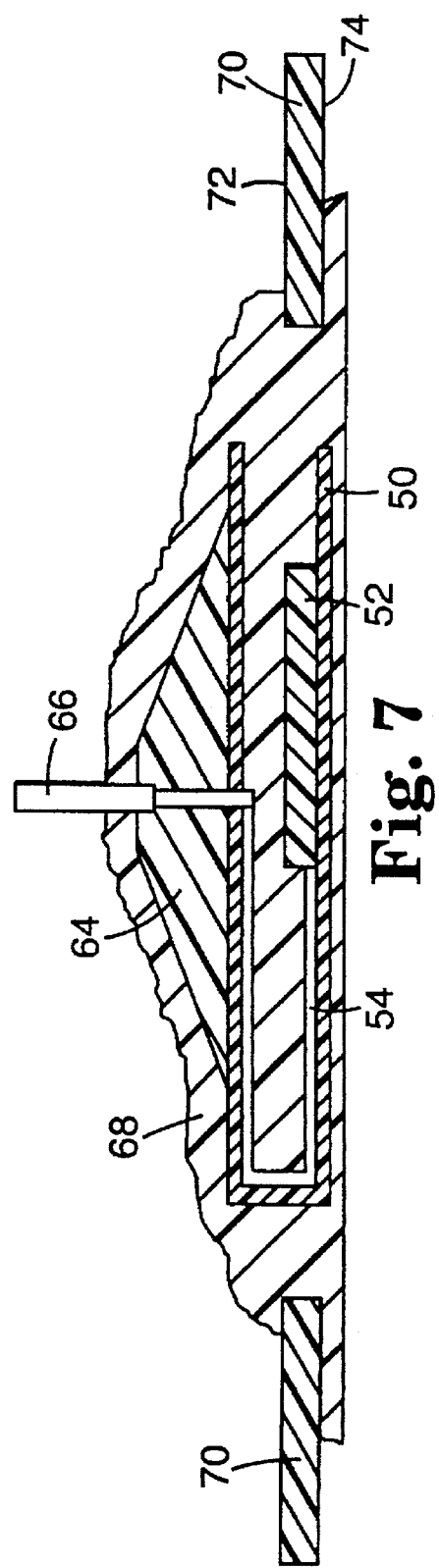

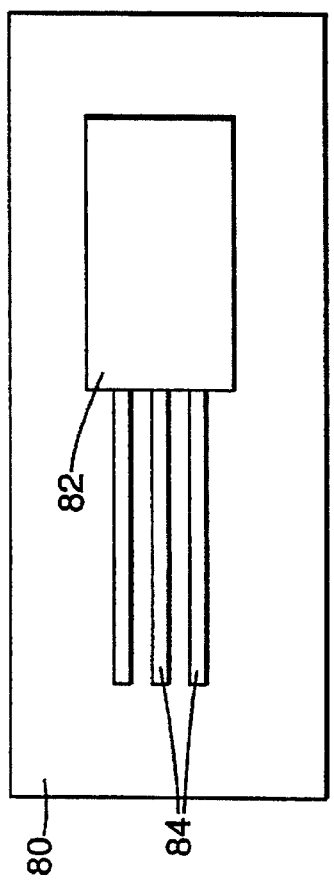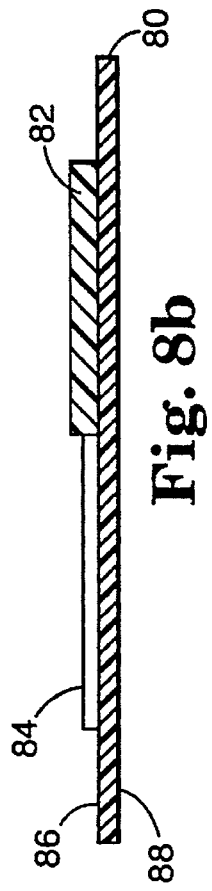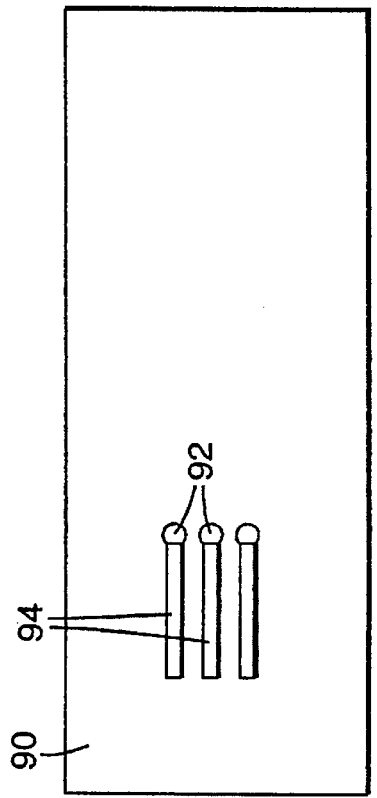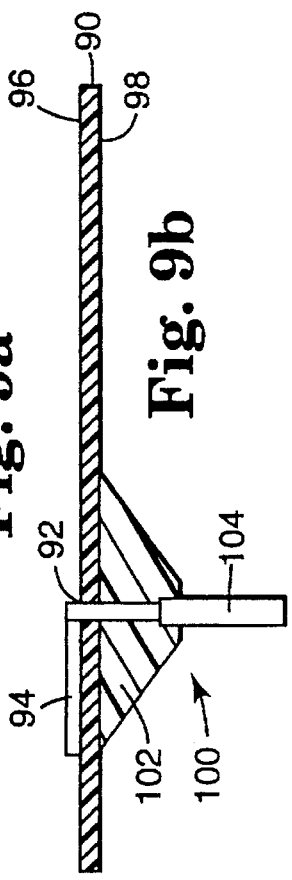

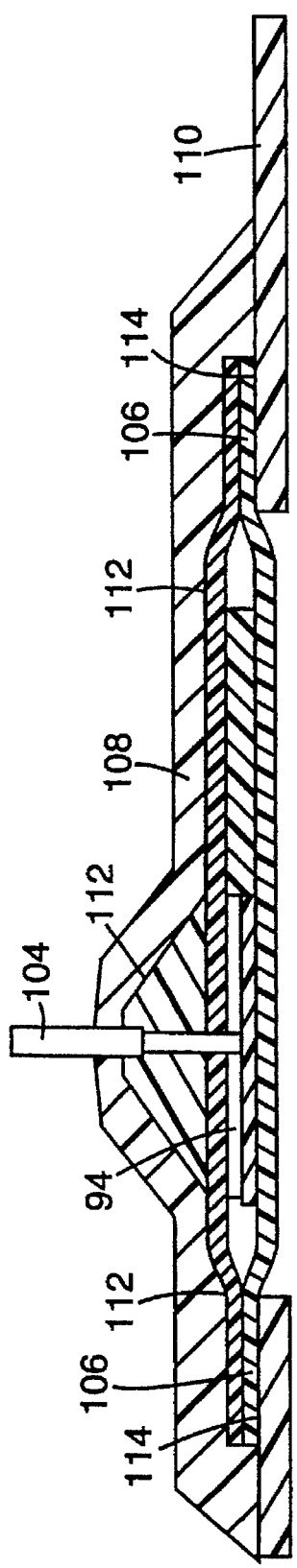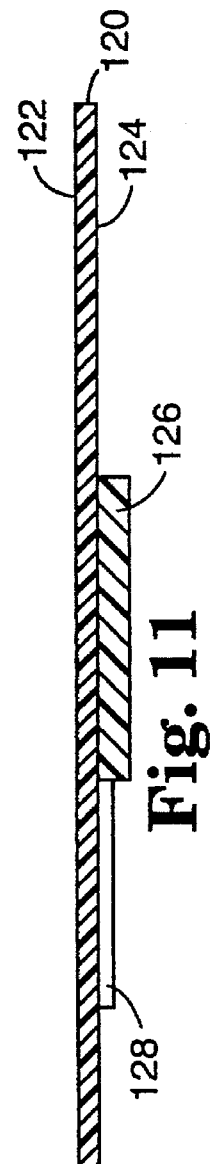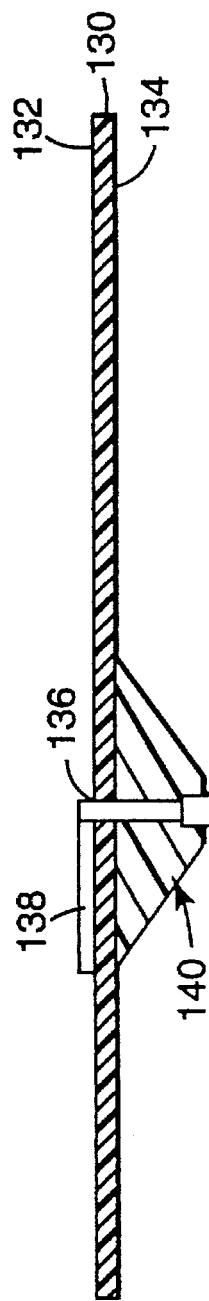

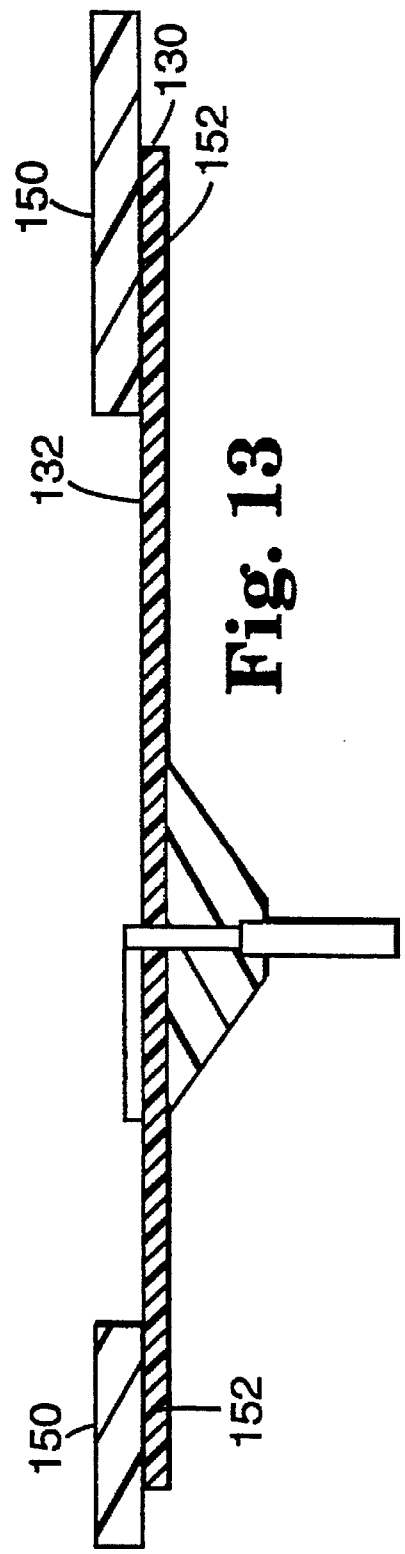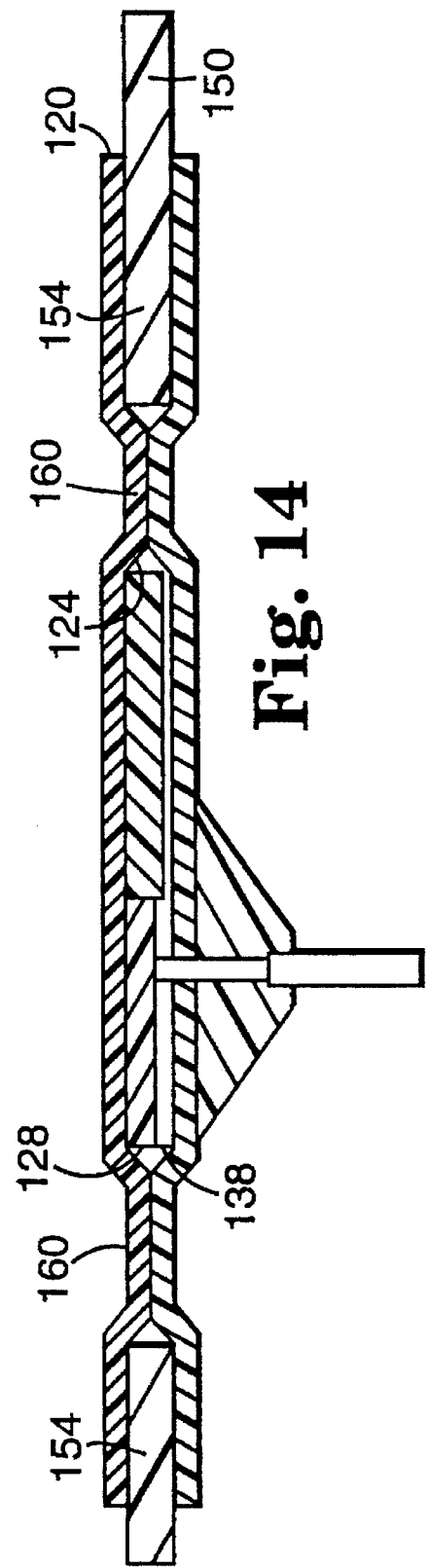

ELECTRONIC LICENSE PLATE HAVING A SECURE IDENTIFICATION DEVICE

This is a continuation of application Ser. No 08/439,366 filed May 11, 1995 now abandoned.

FIELD OF THE INVENTION

The present invention generally relates to electronic license plates and electronic signs for use in electronic vehicular identification and communication systems as well as in vehicle to roadside or vehicle to vehicle communication systems. More specifically, it relates to measures for securing the permanent or restricted electronic information in electronic license plate architectures wherein permanent information is electronically embedded in electronic components in the license plate portion of the system and the remaining system electronics reside in other structures.

BACKGROUND OF THE INVENTION

With the ever increasing volume of traffic on roadways, there is a need for more efficient and safer traffic management. The need for local, unidirectional or bi-directional communication, involving specific vehicles and specific information, or between the roadside and vehicles, has been accomplished by various schemes. Some schemes include directional antennas, selected radio frequencies, both continuous and pulsed, and signal encoding. Electronic license plates have also been developed for such local communication. Electronic license plates are license plates that provide both visual information as traditional license plates provide, as well as electronic information and communication. The electronic information can be used for automatic vehicle identification for toll collection purposes or for identification of special vehicles, such as buses to improve scheduling, and police cars and ambulances to improve the efficiency of dispatching such vehicles. Highway vehicles can be electronically monitored by law enforcement agencies. Currently, police use license plates to visually identify vehicles. With electronic license plates, police can use the visual information in conjunction with radio frequency interrogation systems to electronically request and receive the same information provided visually by the license plate, as well as other information, such as the validity of required on-board documents, such as insurance, registration or emission certificates. Other uses of systems using the electronic communication capabilities of electronic license plates include automatic restriction of areas to certain vehicles, traffic control, vehicle theft protection, toll collection, collision avoidance and emergency message communication.

One way to provide electronic information in addition to the visual information is to provide an electronic module in a vehicle for electronically communicating with an interrogator. For example, in U.K. Patent Application GB 2,256, 072A to Matsushita Electric Industrial Co. Ltd., a road antenna from an automatic vehicle identification system receives, by radio, data from an identification transponder which is separate from the license plate and is located inside the vehicle. While having an electronic module separate from the license plate accomplishes the goal of providing both electronic and visual information, it is further desirable to have both integrated into a single unit for ease of installation, the ability to use existing structures on vehicles for installation, to optimize antenna location for low power communication between the roadside and the vehicle and to ensure that the visual and electronic information is consistent. Further, it is desirable to have both integrated into a single unit for security reasons. For example, the module containing the electronic information could be stolen from a vehicle and placed inside another vehicle to provide incorrect billing information for a toll collection system.

An example of an integrated electronic license plate wherein both visual and electronic information are provided in a unitary structure is disclosed in U.S. Pat. No. 4,001,822 to Sterzer. The Sterzer electronic license plate has a plurality of layers. The top layer is an electrically non-conductive layer having visual information printed on it where the visual information is similar to the information on a conventional license plate. Behind the top layer are two antenna networks disposed on both sides of a dielectric substrate, a harmonic generator, a signal detector, a connector, internal memory, and an integrated circuit chip to provide the encoder function of the system. This dielectric layer thus serves as a substrate upon which the electronic components of the system are placed and interconnected by printed wire connections. Another non-conducting layer is placed behind the dielectric substrate to provide protection for the antenna network. The antenna networks can receive an interrogation signal from a microwave transmitter and transmit an identification signal in response to the interrogation signal. The Sterzer license plate derives a harmonic signal from the interrogation signal and re-radiates the identification signal at the harmonic frequency. The license plate may further receive external coding from the vehicle.

Integrated electronic license plates are relatively expensive as compared to conventional license plates. Integrated electronic license plates not only include the visual information and structure that conventional license plates have, but also include a number of more costly components, such as the antenna network, the communications electronics and the signal processing electronics. Many states require that license plates be replaced periodically to ensure the integrity of the structure and the quality of the visual information. The expense associated with periodically replacing integrated electronic license plates such as described by Sterzer, however, could be unacceptable.

Integrated electronic license plates integrate all the electronics into a single unit. In many circumstances, however, it is desirable to have both permanent, or restricted, information, such as the license plate number or vehicle identification number, and variable information, such as billing information for toll collection or permit information. The restricted information is preferably stored in a secure location, such that only the issuing authority has access to modify such information while easily accessible electronics would preferably be provided for the variable information such that many organizations could access and utilize them. With integrated electronic license plates, however, the electronics storing such information is not configured in such a manner to allow both secure, permanent information and variable information stored in flexible electronics.

Visual communication of specific motor vehicle identification has long been accomplished by a license plate with a signature of the state and year of registration along with a unique identification number. Police departments and other organizations use the license plate number as identification of a vehicle. Therefore, it is important to such organizations that the license plate number is easily readable. In the past, the surface of the license plate was painted in a bright color for ease of reading the visual information. The optical efficiency of locating and reading license plates has been significantly enhanced by use of an optically retroreflective surface such as 3M brand Scotchlite™ Reflective License Plate Sheeting, manufactured by Minnesota Mining and Manufacturing Company of St. Paul, Minn., and printed with the appropriate vehicle designation.

With integrated electronic license plates, however, information associated with a vehicle can be communicated electronically, thereby obviating the need to visually read the license plate number when appropriate electronic readers are present. Moreover, because an electronic license plate can convey more information electronically than a standard license plate can visually, the electronic license plate has many additional uses, such as for obtaining vehicle classifications or permits, for billing purposes in an electronic toll collection system or for a restricted access road system. Because important information is contained in the electronic license plate, it is desirable that the electronic portion of the license plate is secure. More specifically, it is desirable that the portion of the electronics carrying restricted information about a specific vehicle such as the license plate number, expiration date or the vehicle identification number is secure such that they cannot be stolen and switched to another vehicle. It is also desirable, however, that the electronic license plate system provides flexibility in use, such that license plates can be replaced at a relatively low cost and that additional electronic information can be programmed into the system if desired without jeopardizing the integrity of the secured permanent information.

Similar to electronic license plates, electronic road signs have been developed for unidirectional or bi-directional communication between vehicles and the roadside, such as for in-vehicle signing. An electronic road sign has a surface with printed visual information for visual communication of desired information, such as toll collection, traffic control information or dangerous condition warnings. The electronic road sign also has a transmitter to electronically transmit information associated with the road sign. In-vehicle signing allows a vehicle on the roadway to electronically receive the information from the roadside transmitter and display the information inside the vehicle. Also, the information can be communicated by audio within the vehicle. The electronic road sign may also have a receiver to receive information from the vehicle, such as in toll collection to verify transactions, or from traffic management centers to update the message information to be delivered to a vehicle.

SUMMARY OF THE INVENTION

The present invention is used with an electronic license plate system having an identification device installed on a license plate portion and the remaining electronics located elsewhere, such as in the license plate holder or other locations within the vehicle. The present invention prevents tapering with the identification device installed in the license plate portion as well as removing the entire license plate portion from a first vehicle and installing it on another unauthorized vehicle. When one attempts to remove the identification device from the license plate portion, the present invention renders the identification device inoperable for installation onto another vehicle. Similarly, when a license plate portion is removed from one vehicle and installed on another vehicle, either an alarm signal is transmitted by the system or the system is inoperable.

BRIEF DESCRIPTION OF THE DRAWINGS

The present invention will be more fully described with reference to the accompanying drawings wherein like reference numerals identify corresponding components, and:

FIGS. 5a and 5b are a top view and a side cross-sectional view of a portion of an identification device of the present invention;

FIG. 6 shows the portion of the identification device of FIGS. 5a and 5b folded in half;

FIG. 7 shows the identification device of FIG. 6 enclosed by molding and installed in a license plate substrate;

FIGS. 8a and 8b show a top view and a side cross-sectional view of a first portion of an identification device of the present invention;

FIGS. 9a and 9b show a top view and a side cross-sectional view of a second portion of an identification device of the present invention;

FIG. 10 shows the first and second portion of the identification device shown in FIGS. 8a, 8b, 9a, and 9b installed on a license plate substrate;

FIG. 11 shows a side cross-sectional view of a first portion of an identification device;

FIG. 12 shows a side cross-sectional view of a second portion of an identification device;

FIG. 13 shows the second portion of an identification device installed on a license plate substrate;

FIG. 14 shows the first and second portions of an identification device installed on a license plate substrate;

DETAILED DESCRIPTION OF A PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
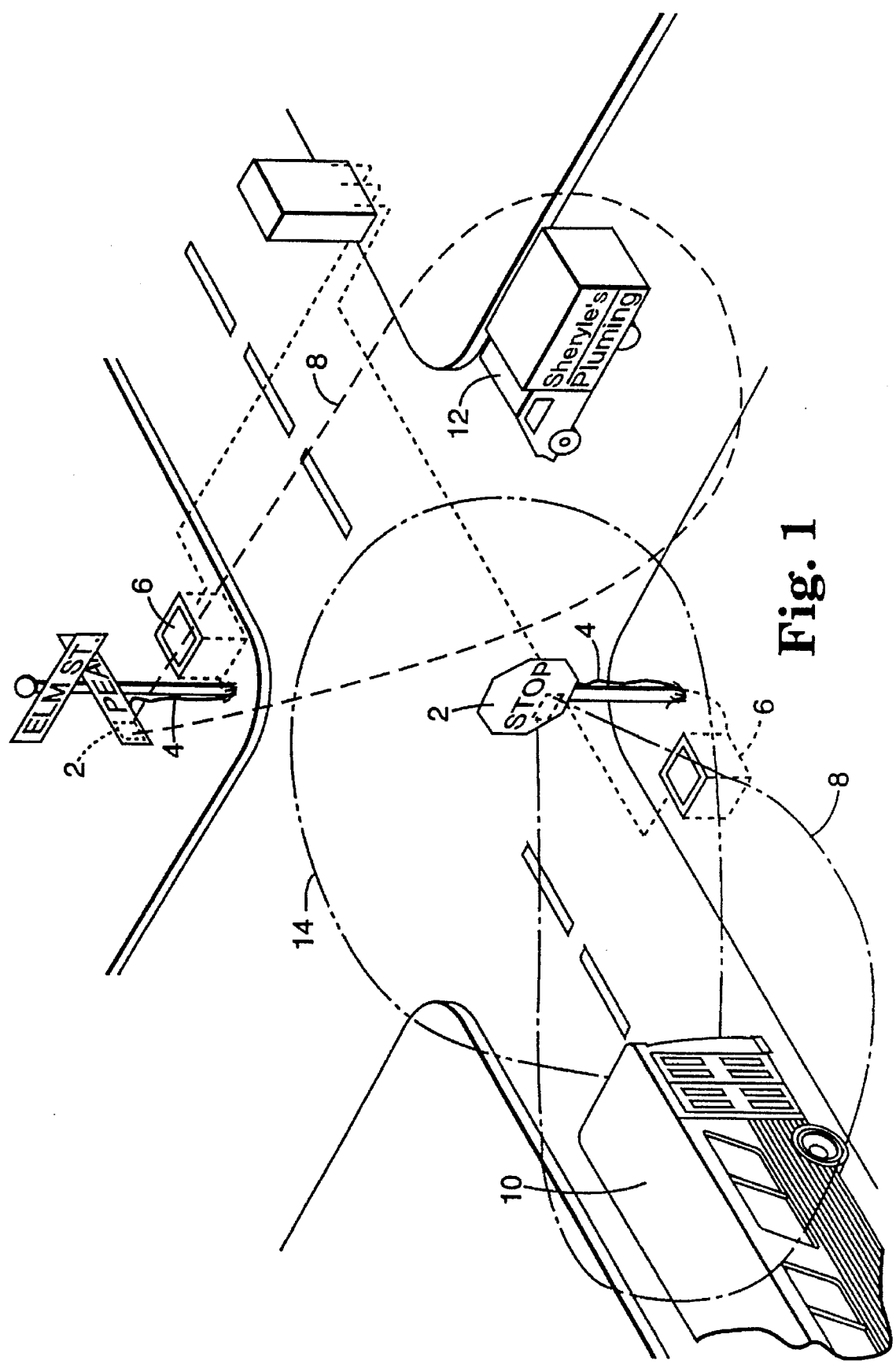
FIG. 1 is a perspective view of a roadway intersection where electronic signs and electronic license plate systems have been installed.

FIG. 1 is a perspective view of a roadway intersection where electronic signs have been installed and some vehicles are equipped with electronic license plates. Integrated electronic signs 2, in the form of a STOP sign and a street sign, communicate information to drivers of vehicles both visually and electromagnetically. Signs 2 are connected by cable 4 to interface unit 6, which may include a power source, electronics or a communication interface with a central traffic management center. Interface unit 6 is preferably buffed in the ground to avoid congesting the roadside and to protect the components within the unit. Vehicles in the form of bus 10 and truck 12 include integrated electronic signage in the form of license plates (not shown), which are similar to signs 2 and communicate information both visually and electromagnetically. Antennas within signs 2 radiate fields 8, which communicate information electromagnetically. The electronic license plate of bus 10 is interactive, with a receive and a send mode, and radiates field 14 when sending information electromagnetically. The electronic license plate of truck 12, however, includes a less complex antenna system such as a passive backscatter system, and does not radiate a field.

Figure 2:
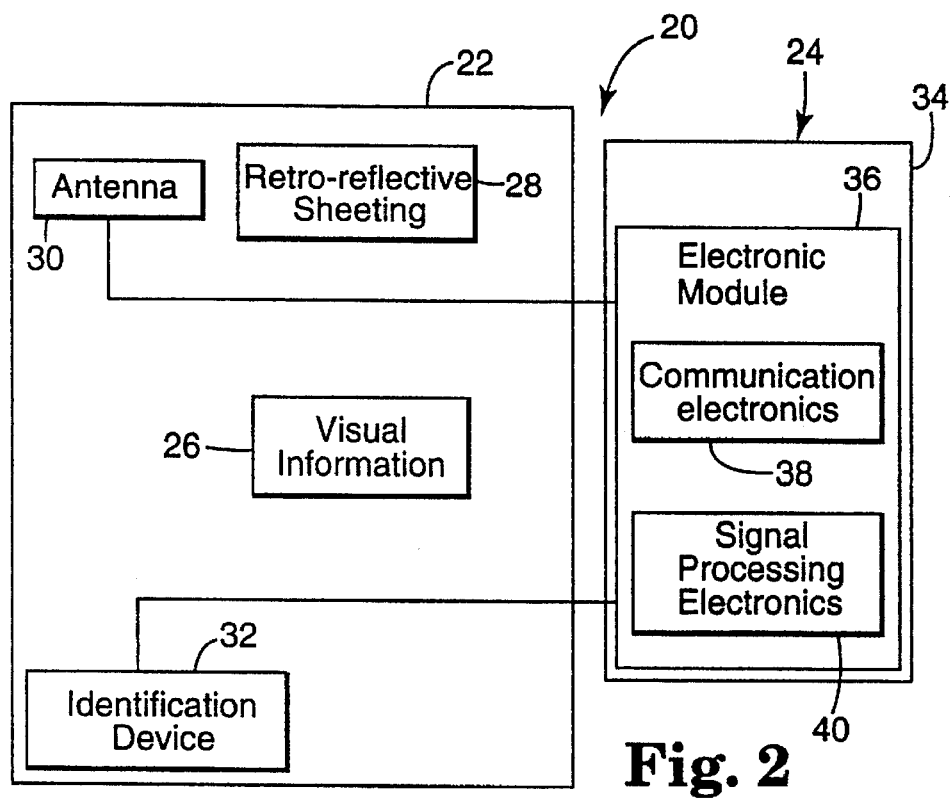
FIG. 2 is a schematic diagram of the electronic license plate system of the present invention.
Figure 3:
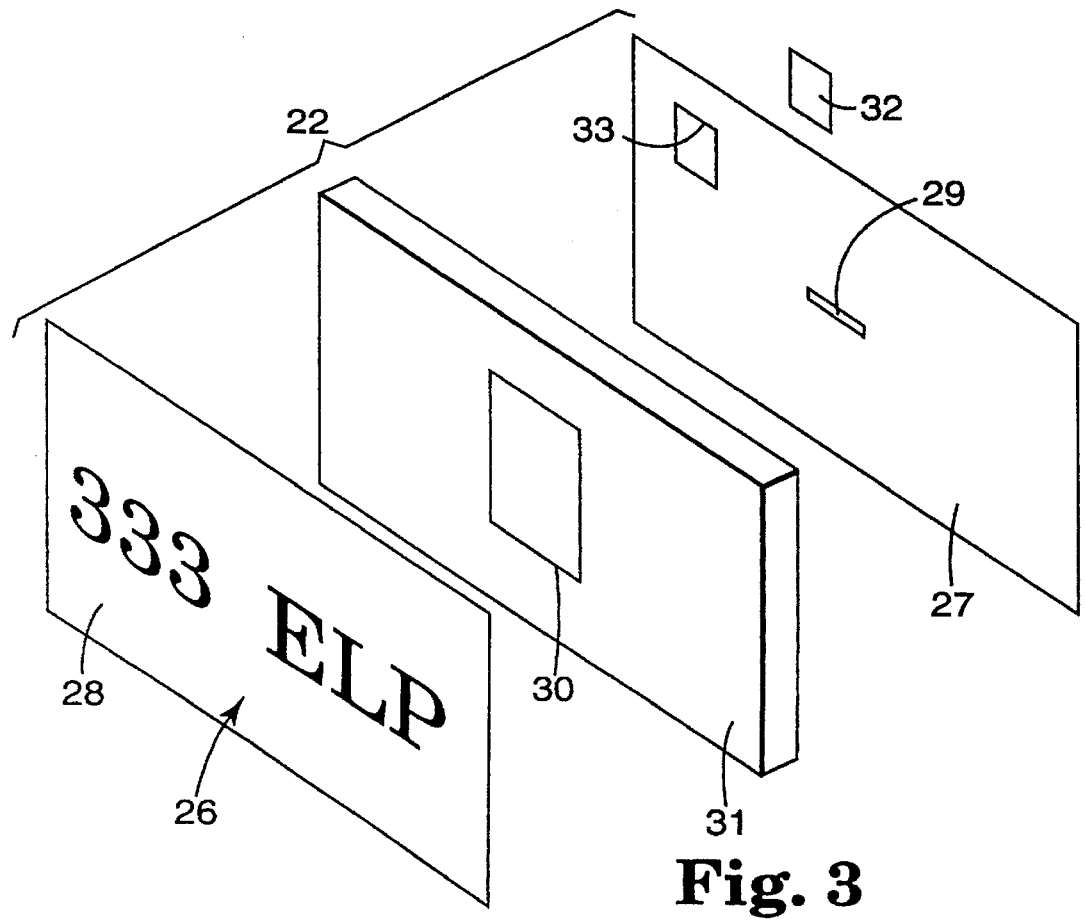
FIG. 3 is an exploded view of an electronic license plate portion of the present invention.
Figure 4:
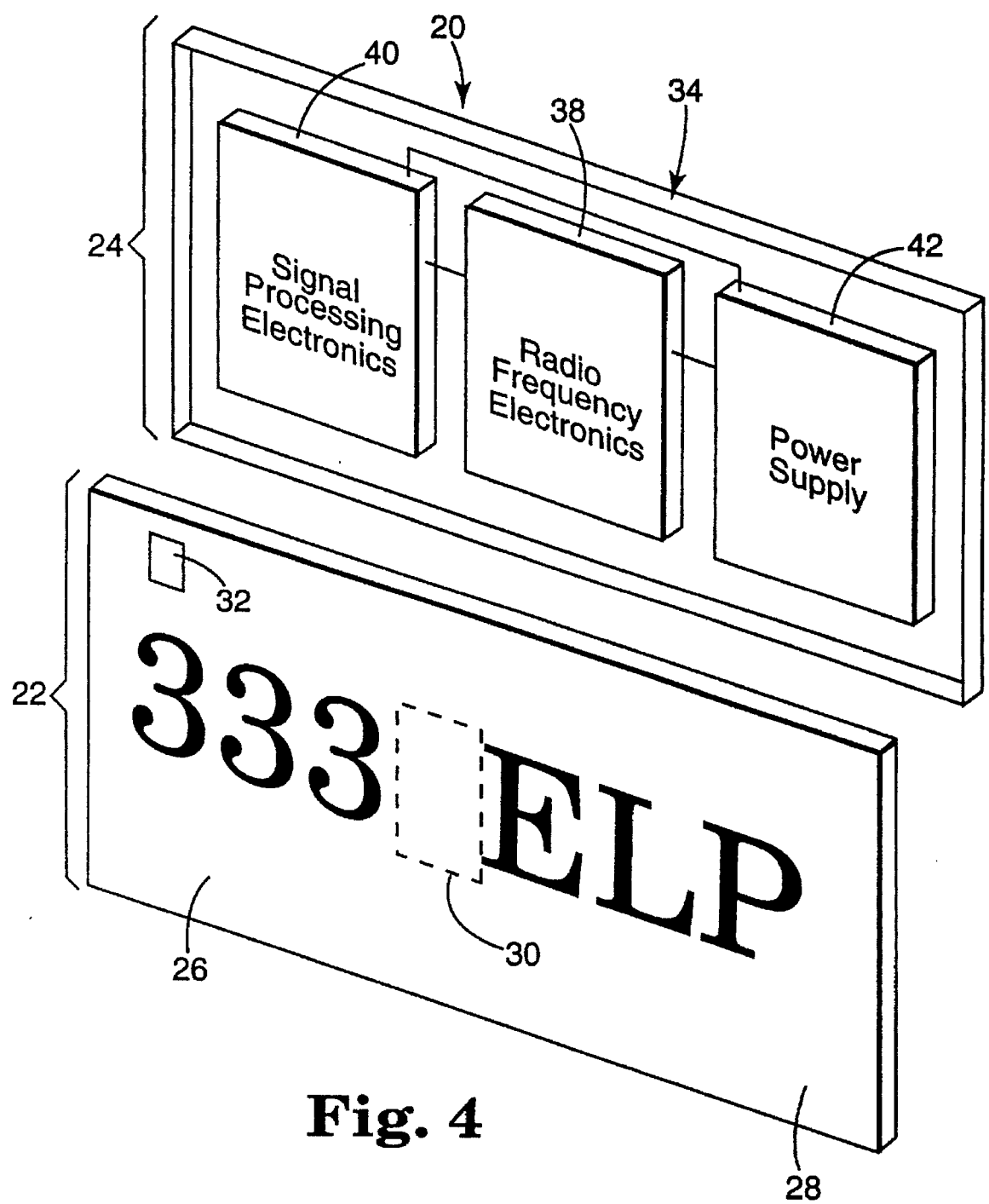
FIG. 4 is a partially exploded view of the electronic license plate system of the present invention.
Figure 15:
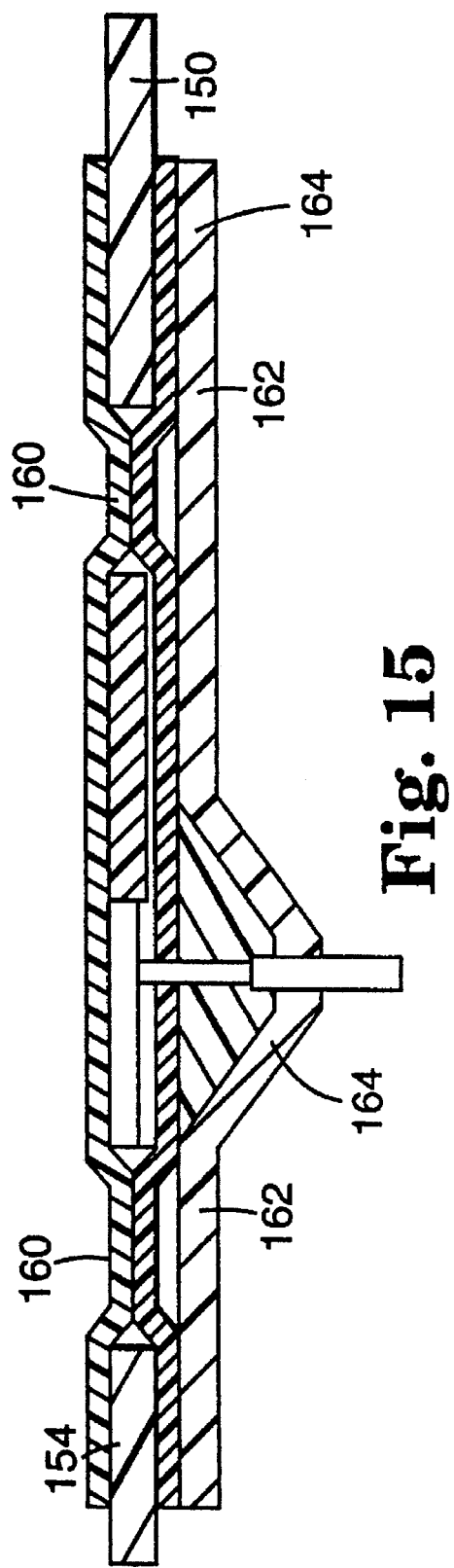
FIG. 15 shows the first and second portions of an identification device with a molding installed on a license plate substrate.

FIG. 2 is a schematic diagram and FIG. 4 is an exploded view of an electronic license plate system that could employ the present invention. Electronic license plate system 20 has two main portions, license plate portion 22 and license plate holder/electronics portion 24. FIG. 3 is an exploded view of license plate portion 22. License plate portion 22 contains a conventional license plate, such as those typically issued by a Department of Motor Vehicles of a state. The conventional license plate contains visual information 26, such as the license plate number, the expiration date of the license plate and the state issuing the license plate. To enhance the optical efficiency of locating and reading license plates, retroreflective sheeting 28 is often applied to license plate 22. Retroreflective sheeting 28 has an optically retroreflective surface such as 3M brand Scotchlite™ Reflective License Plate Sheeting, manufactured by Minnesota Mining and Manufacturing Company of St. Paul, Minn., and printed with the appropriate vehicle designation.

License plate portion 22 further can include antenna 30 for electromagnetic communication with other similarly equipped vehicles, electronic signs or other systems equipped with antennas for electromagnetic communication. Antenna 30 can be any type of suitable antenna. When integrating antenna 30 into license plate portion 22, however, it is preferable that antenna 30 is a planar antenna, such as a microstrip patch antenna placed on dielectric substrate 31. Conductive substrate 27 acts as a ground plane for antenna 30, conductive substrate 27 having an aperture 29 therethrough for aperture coupling to a transmission line (not shown) on the license plate holder portion 24 of the system. Conductive substrate, 27 can further have an opening 33 therethrough or other suitable fastening means for placement of identification device 32. An example of such an electronic license plate having an integrated antenna is described in commonly-assigned U.S. patent application Ser. No. 08/196,294 entitled "Integrated Retroreflective Electronic Display" to Bantli et al., filed Feb. 14, 1994. In another embodiment, however, antenna 30 may be placed in license plate holder portion 24 to simplify the components in license plate portion 22. An example of such a system is described in commonly-assigned U.S. patent application Ser. No.08/438,951 entitled "Electronic License Plate Architecture" to Bantli et al., filed even date herewith.

Because electronic license plate systems can be used for a variety of purposes that might require variable information, such as billing information for electronic toll collection or vehicle insurance information for authorities checking the expiration of such documents, it is desirable to store both permanent information and variable information in the system. Identification device 32 is embedded in license plate portion 22 to provide electronic information to the system, and more preferably, permanent electronic information. Permanent electronic information is information that should not change, such as the license plate number associated with a license plate or the vehicle identification number of the vehicle to which the license plate is attached. Identification device 32 may be any suitable electronic components, such as a write-once read-many (WORM) type memory device, an erasable programmable read only memory (EPROM), an electrically erasable programmable read only memory (EEPROM), a programmable read only memory (PROM) or a battery backed CMOS. Because the permanent information stored in identification device 32 is information that should not change, it is preferable that the permanent information is programmed into identification device 32 at the time of manufacture or under the control of authorities such as the Department of Motor Vehicles before issuance of the license plate.

Referring back to FIGS. 2 and 4, license plate holder/ electronics portion 24 is comprised of two structures, license plate holder 34 and electronic module 36. License plate holder 34 is a mechanical fastening system for holding license plate portion 22 securely to the vehicle. In a simple embodiment, license plate holder 34 may be any fastener such as bolts or screws placed through holes in license plate portion 22 and screwed into a predetermined area on the vehicle. In other embodiments, however, license plate holder 34 may fasten license plate portion 22 in a such manner to protect tampering with identification device 32, as will later be described. Further, license plate holder 34 may include an interface between license plate portion 22 and electronic module 36 when electronic module is not placed in a proximate location with respect to license plate portion 22.

Electronic module 36 preferably resides in license plate holder portion 24 as shown in FIG. 2. Electronic module 36 may reside, however, in other areas of the vehicle, such as in the trunk or dashboard of the vehicle. It is further desirable for automobile manufacturers to integrate the electronics within the vehicle or vehicle electronics without jeopardizing the integrity of the standard visual and secured permanent information. Electronic module 36 contains communication electronics 38 and signal processing electronics 40. Communication electronics 38 includes antenna 30 in those embodiments where antenna 30 is not integrated into license plate portion 22. Communication electronics 38 further includes radio frequency (RF) electronics to transmit or receive an RF signal from antenna 30. RF electronics include those components well known in the art such as modulation and demodulation circuits for converting signals between digital and analog formats, a field strength detector, a receive detector, and a decoder for receiving signals and a transmit oscillator/modulator and a transmit power amplifier for transmitting the modulated RF voltage to antenna 30. Moreover, it is not necessary for both communication electronics 38 and signal processing electronics 40 to be placed together. For example, communications electronics may be placed in license plate holder portion 24 to minimized RF losses while signal processing electronics 40 could be placed in the trunk or dashboard of the vehicle.

Signal processing electronics 40 are used to encode or decode the signal to and from the RF electronics and may be a passive or active system. Signal processing electronics 40 make logic decisions based on instructions contained in the received signal and execute the transmission protocol. Moreover, using the information stored in identification device 32, they format a message into a digital bit stream to be transmitted. The formatted message is sent to the transmit circuit of radiofrequency electronics in communication electronics 38. Signal processing electronics 40 may include a receiver decoder for decoding the digital signal into a binary bit stream, a protocol logic unit for decoding the protocols and may also include electronics monitoring the status of power source 42. Signal processing electronics 42 may further include electronics for data processing. Communications electronics 38 are preferably located close in proximity to antenna 30 to minimize RF losses. Thus, in an embodiment where antenna 30 is placed in license plate portion 22, it is preferable to place at least communications electronics 38 in license plate holder portion 24.

In the electronic license plate systems in which the present invention may be utilized, identification device 32 is mounted on the license plate portion of the system. The present invention allows the license plate portion 22 to interface with the electronics in holder 24 and does not allow license plate portion 22 to be removed without destroying license plate portion 22 or identification device 32, rendering the system inoperable or transmitting an alarm signal to alert the authorities of potential tampering. Further, it may prevent electromagnetic communication using the system when an improper identification device is connected to the electronics in the vehicle. This ensures the accuracy of the permanent, vehicle-specific information sent from identification device 32 to an interrogating unit, and the integrity of the entire system.

In one embodiment of the present invention, license plate portion 22 is permanently connected to license plate holder portion 24 and also permanently attached to the vehicle. In such an embodiment, the electronic license plate system 20 is permanently attached to the vehicle for the duration of the validity of the license plate. In such an embodiment, the entire license plate need be destroyed to remove it from the vehicle, thereby ensuring that the license plate may not be remounted in a holder of another vehicle.

FIGS. 5a and 5b show a top view and a side cross-sectional view of a chip mounting device used in a second embodiment of the present invention. The second embodiment as shown in FIGS. 5a, 5b, 6, and 7 prevents the identification device mounted on the license plate portion of the system from being removed without destroying the device. This prevents removal of the identification device from a first vehicle and remounting the device on a second vehicle. Referring back to FIGS. 5a and 5b, identification chip 52, such as a semiconductor chip, a WORM type of memory or an EEPROM is mounted on flexible substrate 50. Flexible substrate may be any flexible circuit substrate, such as Kapton® film, manufactured by E. I. DuPont DeNemours Inc., Wilmington, Del., having a first side 58 and a second side 60. Conductive lines 54, such as copper microstrip lines, electrically connect identification chip 53 to conductive feed through 56. Conductive lines 54 may be rolled copper attached with adhesive or may be formed using any printed circuit board techniques, such as etching. Conductive feed through 56 are preferably copper, thereby providing a conductive path from first side 58 of flexible substrate 50 to second side 60 of flexible substrate 50. Connector 62 is mounted on second side 60 of flexible substrate 50. Feed throughs 56 have means for mounting a connector on second side 60 of substrate 50, such as surface mounting pads. Connector 62 may be any connector designated by system requirements, such as a three pin surface mounted connector, as shown. Three pin surface mounted connector 62 has three pins 66 (only one shown), each pin 66 connected to conductive feed through 56. Base 64 provides support to pins 66. The entire structure is preferably coated with a protective, non-conductive coating, such as Fluorad™, manufactured by Minnesota Mining and Manufacturing Company, St. Paul, Minn., to protect from corrosion. During the coating process, connector pins 66 are masked.

While the structure shown in FIGS. 5a and 5b may be mounted on a license plate, it is preferable to protect the identification chip and conductive lines as well as reduce the size of the package to make it more compact. Referring to FIGS. 5a and 6, identification chip 52 and conductive feed throughs 56 are positioned on flexible substrate 50 such that flexible substrate 50 can be folded, preferably in half lengthwise, such that identification chip 52 and conductive lines 54 are positioned on the inner periphery of the folded electronic module and connector 62 is positioned on the outer periphery of the folded electronic module. The folding may be achieved by die cutting the Kapton® film, as indicated by the dotted lines in FIGS. 5a and 5b, except for the portions of the film where conductive lines 54 are located. The inside of the folded electronic module can be filled with an epoxy or a non-conductive filler film to provide further structural integrity.

FIG. 7 shows the folded electronic module, or the identification device, installed in a license plate. A molded structure is formed around the folded electronic module shown in FIG. 6. Molded structure 68 is preferably formed of Valox™, manufactured by General Electric Corporation, and in a shape such that it can be snapped into the matched opening 33, shown in FIG. 3, of the rear aluminum, plastic or metal substrate of the license plate portion. Substrate 70 of the license plate portion has an outer side 74 and an inner side 72. Molded structure 68 is preferably pressed through outer side 74 of substrate 70 and is sized to snap into the opening and lock into place. Connector pins 66 extend out from inner side 72 of substrate 70 to connect with a matching connector in the license plate holder portion of the system.

FIGS. 8a and 8b show a top view and a side cross-sectional view of a first identification device portion of another embodiment of the present invention. Substrate 80 has a first side 86 and a second side 88. Identification chip 82 is similar to identification chip 52 shown in FIG. 5a and is mounted to first side 86 of substrate 80. Conductive lines 84 are preferably copper microstrip lines that electrically connect to identification chip 82. FIGS. 9a and 9b show a top view and a side cross-sectional view of a second identification device portion. Substrate 90 is the same substrate as used for substrate 80 and has a first side 96 and a second side 98. Conductive lines 94 are preferably copper microstrip lines that electrically connect to conductive feed throughs 92 on first side 96 of substrate 90. Conductive feed throughs 92 are conductors that provide a conductive feed from first side 96 to second side 98 of substrate 90. Feed throughs 92 have means for mounting a connector on second side 98 of substrate 90, such as surface mounting pads. Connector 100 has connector pins 104 and base 102 to support pins 104. Connector 100 is mounted on second side 98 of substrate 90 with connector pins 104 electrically connected to conductive feed throughs 92 on second side 98 of substrate 90.

The identification device is formed by laminating the first identification device portion with the second identification device portion. Electrical connections are made between conductive lines 84 and 94, such as by using conductive epoxy or wave soldering. The outer edges of first side 86 of substrate 80 and first side 96 of substrate 90 are laminated together using adhesive 106 having a first bonding strength. Molding 108 provides stability to the identification device and absorbs connection forces when the identification device is connected to the matching connector located in the license plate holder. Molding 108 is secured to second side 98 of substrate 90 with adhesive 112 having a second bonding strength, the second bonding strength being greater than the first bonding strength of adhesive 106. The entire assembly is placed in the opening of the license plate portion and secured with adhesive 114 between second side 88 of substrate 80 and license plate substrate 110. In such an embodiment, it is not necessary for license plate portion to have an opening. If no opening exists, identification device is affixed to the back of license plate portion with adhesive 114. Adhesive 114 has a third bonding strength, the third bonding strength being greater than the second bonding strength of adhesive 112. If one attempts to remove the identification device after installation, the device splits at the lamination between the first and second identification device portions, thereby disconnecting the connector and rendering the device useless.

FIGS. 11 through 15 show yet another embodiment of the present invention. FIGS. 11 and 12 correspond with FIGS. 8b and 9b, respectively. FIG. 11 shows substrate 120 having a first side 122 and a second side 124 with identification chip 126 mounted on second side 124 and conductive lines 128 electrically connected to identification chip 126. FIG. 12 shows substrate 130 having first side 132 and second side 134 with conductive lines 138 connected to conductive feed through 136 and connector 140 mounted on second side 134 to conductive feed through 136. First side 132 of substrate 130 is affixed to license plate substrate 150 using adhesive 152 having a first bonding strength as shown in FIG. 13. Second side 124 of substrate 120 is laminated to first side 132 of substrate 130 using heat lamination or adhesive 160 as shown in FIG. 14. The bonding strength of the heat lamination or second bonding strength of adhesive 160 is less than first bonding strength of adhesive 152. Second side 124 of substrate 120 is also affixed to license plate substrate 150 using adhesive 154 having a third bonding strength, the third bonding strength being greater than the first bonding strength of adhesive 152. Conductive lines 128 and 138 may be connected using various methods, such as using a conductive adhesive or wave soldering.

Molding 162 is placed over the laminated electronic module and affixed to it using adhesive 164 having a fourth bonding strength, the fourth bonding strength being greater than the first bonding strength of adhesive 152 and second bonding strength of adhesive 154. Similar to the identification device of FIG. 10, if one attempts to remove the device, it separates at the lamination between the two portions where adhesive 160 is, the connection between portions 128 and 138 and the connector on the second substrate separates from the chip on the first substrate, thereby rendering the device useless.

In yet another embodiment of the present invention, identification device 32, as shown in FIG. 2, is programmed with a unique code. This code is also stored in signal processing electronics 40 either when the electronics are issued or when the license plate is connected to the electronics for the first time. Examples of unique codes are a Vehicle Identification Number (VIN) that is assigned to every vehicle or the license plate number. Each time a license plate portion 22 is connected to license plate holder 24, signal processing electronics 40 queries identification device 32. Identification device 32 transmits its unique code to signal processing electronics 40 which then compares the unique code received with the unique code stored in its memory. If the two codes match, then electronic module 36 is enabled. If the two codes do not match, electronic module 36 is disabled or an alarm code is enabled. Further, signal processing electronics 40 can periodically interrogate identification device 32 to ensure the unique code continues to match. Such a security system prevents the license plate from being stolen and attached to the electronics of a different vehicle. When the electronic license plate is interrogated, it will reply with the alarm code or not reply at all, thereby signaling a potential stolen license plate.

In yet another embodiment of the present invention, an electronic key is used to ensure that an identification device mounted on a license plate is the correct identification device for the specific vehicle. The electronic key has a second unique code that initializes the electronic module installed in the vehicle and reprograms the electronic module according to the information stored in the identification device. This provides flexibility in the system as any number of license plates may be installed and connected to the electronic module of a vehicle as long as such installation is authorized by the electronic key. Without authorization, a new license plate mounted on the holder will not allow reprogramming of the electronic module, thereby resulting in a mismatch of the codes and a disabling of the electronic module and in the communication of an alarm code, signaling a potential stolen license plate.

Figure 16:
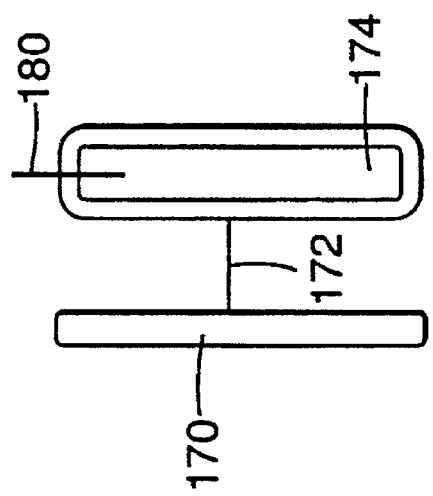
FIG. 16 is a schematic diagram of an electronic license plate system having an electronic key.

Referring to FIG. 16, license plate portion 170 is electrically or electromagnetically connected to license plate holder portion 174 through interface 172. Holder portion 174 further houses the electronic module for the electronic license plate. Electronic key 180 may be a smart card or similar information bearing medium for activating, deactivating, or reprogramming the electronic module, such as electronic module 36 shown in FIG. 2. The electronic key need not be embodied in hardware. For example, the electronic key can be embodied in software and entered through the antenna communication interface. Such a wireless interface can add reliability to the system because no physical, external electronic connection is required.

Electronic key 180 may be used as an authorization tool, to ensure correct electronic license plates are installed on vehicles. The first time license plate 170, equipped with an identification device, is connected to holder 174, an initialization or activation process is performed. When electronic key is inserted, the electronic module interrogates the identification device and reprograms the electronic device to accept the unique code stored in the identification device and the activation process is successful. Once the key is removed, the system may be programmed to operate in two ways. In one embodiment, the electronic module does not retain the unique code of the identification device in its memory after disconnecting the identification device. Thus, each time a license plate is installed, an electronic key is required as an authorization tool. In another embodiment, however, if a license plate is removed, the identification code is retained. Thus, when the same license plate is reinstalled, the electronic module senses the matched codes and enables the electronic module. If the license plate is a new license plate, however, an electronic key is required for initialization. In yet another embodiment, each time the electronic key is inserted, the memory in the electronic module is programmed with the unique code of the identification device.

In yet another embodiment, the electronic module has stored in it a security code derived from both a unique code of the identification device and another unique code from the electronic key. Only when both unique codes are manipulated to match the security code stored in the electronic module is the electronic module enabled.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

I claim:

1. An electronic license plate system comprising:
   a license plate portion comprising:

support means for providing structure to said license plate portion, said support means having visual information thereon; and an identification device integrated in said support means for storing restricted electronic information;

an antenna;

a holder for supporting said license plate portion;

electronic means for electronic communication with said identification device and said antenna and for data processing; and security means for ensuring the integrity of said electronic license plate system.

2. The electronic license plate system according to claim 1, wherein said security means renders said identification device inoperable when said identification device is removed from said license plate portion.

3. The electronic license plate system according to claim 2, wherein said identification device comprises:

a first substrate having a first side and a second side;

an identification chip mounted on said first side of said first substrate;

first conductive means electrically connected to said identification chip;

a second substrate having a first side and a second side;

second conductive means located on said first side of said second substrate;

a connector located on said second side of said second substrate, said connector electrically connected to said second conductive means;

and wherein said security means comprises:

first bonding means having a first bonding strength, said first bonding means affixing said first side of said first substrate to said first side of said second substrate; and second bonding means having a second bonding strength, said second bonding strength being greater than said first bonding strength, said second bonding means affixing said second side of said first conductive substrate to said support means.

4. The electronic license plate system according to claim 3, wherein said identification device further comprises a molding and wherein said security means further comprises third bonding means having a third bonding strength, said third bonding strength being greater than said first bonding strength and less then said second bonding strength, said third bonding means affixing said molding to said second side of said second substrate.

5. The electronic license plate system according to claim 2, wherein said support means comprises a support substrate having a first side and a second side and having an opening therethrough, said opening sized to accommodate said identification device, and wherein said identification device comprises:

a first substrate having a first side and a second side;

an identification chip mounted on said first side of said first substrate;

first conductive means electrically connected to said identification chip;

a second substrate having a first side and a second side;

second conductive means located on said first side of said second substrate;

a connector located on said second side of said second substrate, said connector electrically connected to said second conductive means;

and wherein said security means comprises:

first bonding means having a first bonding strength, said first bonding means affixing said first side of said second substrate to said first side of said support substrate, said second conductive means positioned within said opening of said support substrate; and second bonding means having a second bonding strength, said second bonding strength being less than said first bonding strength, said second bonding means affixing said first side of said first substrate to said first side of said second substrate; and third bonding means having a third bonding strength, said third bonding strength being greater than said first bonding strength, said third bonding means affixing said first side of said first substrate to said second side of said support substrate, said first conductive means electrically connected with said second conductive means.

6. The electronic license plate system according to claim 5, wherein said identification device further comprises a molding and wherein said security means further comprises fourth bonding means having a fourth bonding strength, said fourth bonding strength being greater than said first bonding strength and less then said third bonding strength, said fourth bonding means affixing said molding to said second side of said second substrate.

7. The electronic license plate system according to claim 1, wherein said security means identifies when an improper identification device is connected to said electronic means.

8. The electronic license plate system according to claim 7, wherein said security means comprises:

a first code stored in said identification device;

a second code stored in said electronic means;

means for comparing said first code and said second code, said security means determining said identification device is said improper identification device when said first code and said second code do not match.

9. The electronic license plate system according to claim 8, wherein said security means further comprises means for disabling said electronic means when said first code and said second code do not match.

10. The electronic license plate system according to claim 8, wherein said security means further comprises means for transmitting an alarm signal when said first code and said second code do not match.

11. The electronic license plate system according to claim 7, wherein said security means comprises:

a code stored in said identification device; and an electronic key for authorizing programming of said code onto said electronic means.

12. The electronic license plate system according to claim 11, wherein said security means further comprises means for transmitting an alarm signal when said code stored in said identification device does not match the code stored in said electronic means.

13. The electronic license plate system according to claim 11, wherein said electronic means retains said code even when said identification device is removed from said system.

14. The electronic license plate system according to claim 11, wherein said electronic means does not retain said code when said identification device is removed from said system.

15. The electronic license plate system according to claim 7, wherein said security means comprises:

a first code stored in said identification device;

an electronic key storing a second code;

a third code derived from said first code and said second code, said third code stored in said electronic means; and means for enabling said electronic means when said electronic means receives said first code and said second code concurrently.

16. The electronic license plate system according to claim 15, wherein said security means further comprises means for transmitting an alarm signal when said first code and said second code are not received concurrently by said electronic means.

17. A security device for use with an electronic license plate system, said system including a license plate portion having an identification device embedded therein, an antenna and electronic means for electronic communication with said identification device and said antenna, said security device comprising:

means for identifying when an improper identification device is communicating with said electronic means, wherein said means for identifying when an improper identification device is connected to said electronic means includes:

a first code stored in said identification device;

a second code stored in said electronic means;

means for comparing said first code and said second code, said security device determining said identification device is said improper identification device when said first code and said second code do not match.

18. A security device for use with an electronic license plate system, said system including a license plate portion having an identification device embedded therein, an antenna and electronic means for electronic communication with said identification device and said antenna, said security device comprising:

means for identifying when an improper identification device is communicating with said electronic means, wherein said means for identifying when an improper identification device is connected to said electronic means includes:

a first code stored in said identification device;

an electronic key storing a second code;

a third code derived from said first code and said second code, said third code stored in said electronic means; and means for enabling said electronic means when said electronic means receives said first code and said second code.

* * * * *

UNITED STATES PATENT AND TRADEMARK OFFICE
CERTIFICATE OF CORRECTION

PATENT NO.: 5,657,008
DATED: August 12, 1997
INVENTOR(S): Heinrich Bantli

It is certified that error appears in the above-identified patent and that said Letters Patent is hereby corrected as shown below:

Title page, item [57] ABSTRACT, line 6, delete "is".

Column 3, line 50, delete "tapering" and insert therefore --tampering--.

Column 4, line 59, delete "buffed" and insert therefore --buried--.

Column 5, line 35, delete "," after the word "substrate".

Column 12, line 24, delete "then" and insert therefore --than--.

Signed and Sealed this

Seventh Day of April, 1998

Attest:

BRUCE LEHMAN

Attesting Officer

Commissioner of Patents and Trademarks